United States Patent [19]

Boccadoro

[11] Patent Number: 4,864,091
[45] Date of Patent: Sep. 5, 1989

[54] SERVOCONTROL DEVICE FOR AN EROSION MACHINE

[75] Inventor: Marco Boccadoro, Versico, Switzerland

[73] Assignee: AG fur Industrielle, Elektronik Agie, Losone Bei Locarno, Switzerland

[21] Appl. No.: 318,663

[22] Filed: Mar. 3, 1989

[30] Foreign Application Priority Data

Mar. 15, 1988 [DE] Fed. Rep. of Germany ....... 3808646

[51] Int. Cl.$^4$ ............................................... B23H 7/32
[52] U.S. Cl. ............................ 219/69.16; 204/129.25
[58] Field of Search ...................... 219/69.16, 69.13; 204/129.25, 129.5

[56] References Cited

U.S. PATENT DOCUMENTS 4,071,729 1/1978 Bell, Jr. ............................ 219/69.16
4,296,302 10/1981 Bell, Jr. et al. .................. 219/69.16

FOREIGN PATENT DOCUMENTS 125934 9/1980 Japan ................................ 219/69.13
2041574 9/1980 United Kingdom ............ 219/69.16

Primary Examiner—A. D. Pellinen
Assistant Examiner—Geoffrey S. Evans
Attorney, Agent, or Firm—Helfgott & Karas

[57] ABSTRACT

A servocontrol device for controlling a distance between an erosion electrode and a workpiece in an erosion machine calculates an error signal from an actual distance between the erosion electrode and the workpiece and a desired distance. The error signal undergoes low pass filtering, before it is used as a control signal for a drive connected to the erosion electrode to drive the latter. For optimizing the dynamic characteristics, the servocontrol device has a variable cutoff frequency, which is dependent on at least one parameter of a processing pulse supplied to the erosion electrode.

18 Claims, 6 Drawing Sheets

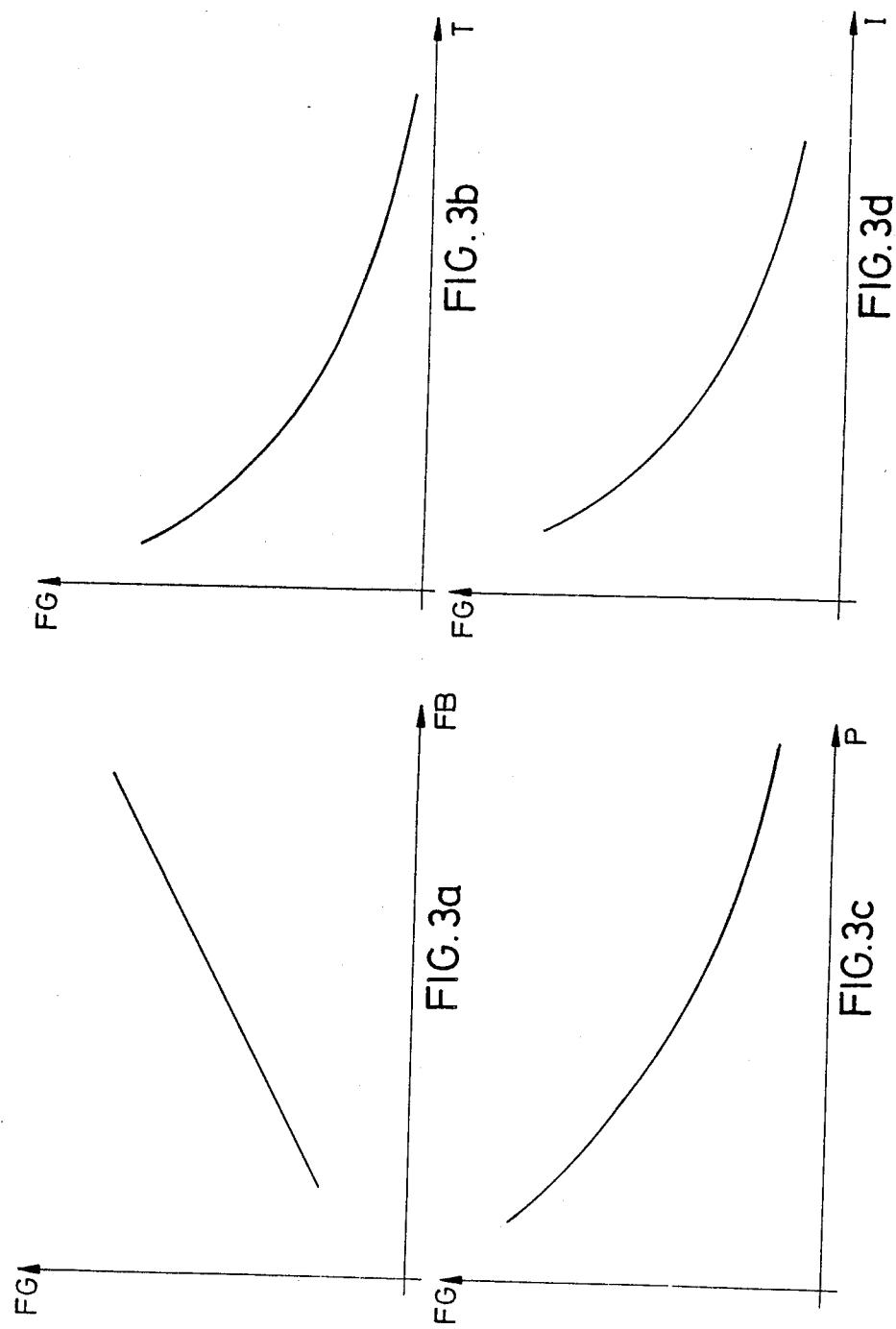

SERVOCONTROL DEVICE FOR AN EROSION MACHINE

BACKGROUND OF THE INVENTION

The present invention relates to a servocontrol device for an erosion machine for regulating the erosion electrode with respect to a workpiece.

A servocontrol device of the type under consideration is already known, for example, from DE-OS No. 22 50 872. In the case of the known servocontrol device, a signal is generated indicating the position of the erosion electrode with respect to a workpiece, this signal being compared with a desired signal. The resulting error signal is supplied to a low pass filter circuit with a fixed cutoff frequency, which is connected on the output side to a driving circuit, which supplies with a driving current a driving device formed by an electromotor for the following up of the erosion electrode. In the known servocontrol device, the means for determining the actual or real distance between the erosion electrode and the workpiece establishes the distance from the ignition time lag between the processing voltage pulses and the processing current pulses.

As a function of the desired operation of the erosion machine, such as e.g. during roughing or during finishing, the frequency of the processing pulses can be varied from the megahertz range into a range of approximately 10 hertz.

Apart from the variation of the frequency of the processing pulses, during erosion, there is also a modification to the value for the optimum spacing between the erosion electrode and the workpiece as a function of different processing parameters, such as e.g. the current amplitude, the pulse duration, the no-load voltage, the conductivity of the liquid in the processing gap and the like. The change to the value for the optimum spacing between the erosion electrode and the workpiece is accompanied by a variation in the time within which it is necessary to carry out a correction of standard deviations from the desired value at a specific processing speed.

Thus, even in the case of erosion processing with a fixed, given frequency, changes take place to the remaining boundary conditions for the processing, so that the control circuit of the known servocontrol device with an invariable control characteristic is not able to satisfy in the same way all the process conditions which occur during the erosion process.

SUMMARY OF THE INVENTION

Accordingly, it is an object of the present invention to further develop a servocontrol device of the aforementioned type so that the following up of the erosion electrode would be adapted to the nature of the instantaneous erosion process.

This and other objects of the invention are attained by a servocontrol device provided with a low pass filter having a cutoff frequency which is adjustable in dependence upon at least one parameter of a processing pulse supplied to an erosion electrode.

By adjusting the cutoff frequency of the low pass filter circuit to at least one parameter of the processing pulse the dynamic behavior of the control circuit during the following up of the erosion electrode is able to satisfy the varying conditions during the erosion process. The inventive servocontrol device not only leads to a higher erosion surface quality, but also reduces workpiece damage risks.

An association circuit may be provided to associate a control value with each value of a filtered error signal. The association between the error signal and a driving signal for the driving mechanism for following up the erosion electrode as suggested in the present invention permits a rapid reaction of the control system in the case of high control deviations with stable control characteristics in the range of small control errors.

The invention is described in greater detail hereinafter relative to a non-limitative embodiment and the attached drawings.

BRIEF DESCRIPTION OF THE DRAWINGS

FIGS. 3a to 3d show graphs of appropriate dependences of the cutoff frequency on different processing parameters;

DETAILED DESCRIPTION OF THE PREFERRED EMBODIMENTS

Figure 1:
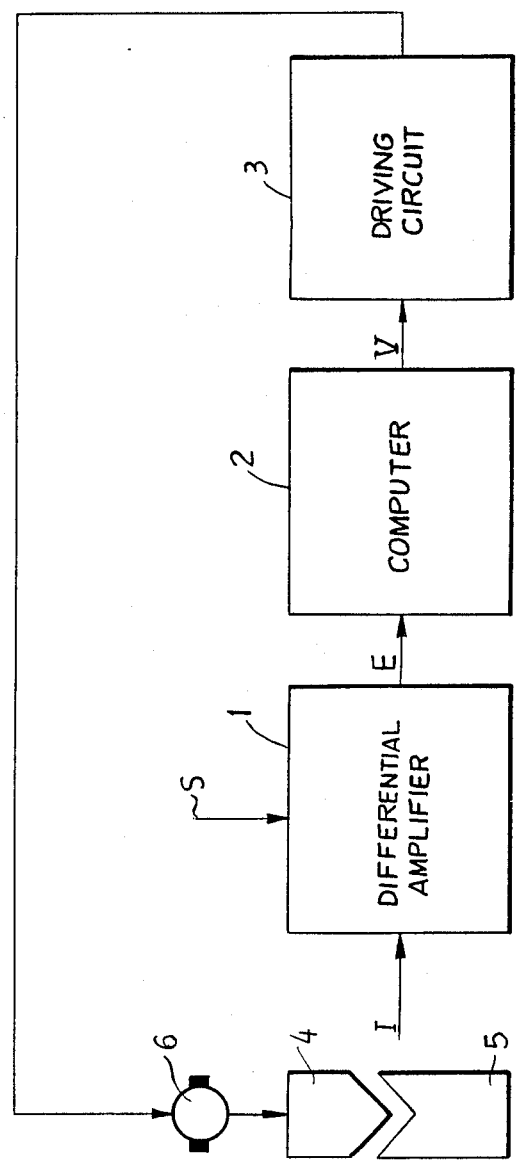
FIG. 1 is a block diagram of an embodiment of the servocontrol according to the invention.

As shown in FIG. 1 the control circuit of the inventive servocontrol device incorporates a means formed by a differential amplifier 1 for calculating an error signal E on the basis of a signal I representing the actual or real distance between an erosion electrode 4 and a workpiece 5 and a signal S representing a desired distance. The error signal E is supplied to a computer 2, which on the one hand carries out a digital low pass filtering of the error signal E and on the other hand converts the thus filtered signal via a specific, table-based association into a control signal V, which is in turn supplied to a driving circuit 3 for a drive motor 6 for moving the sleeve carrying the erosion electrode 4.

The computer carries out a simple first order low pass filtering with a variable cutoff frequency by means of the following formula:

$$A(k) = T/(T+2A) \times (E(k) + E(k-1)) + (2A-T)/(2A+T) \times A(k-1)$$

The values given in this formula have the following content: T designates the scanning time;
A = ½ pi × FG;
pi = 3.1415 . . .;
FG designates the low pass filter cutoff frequency;
A(k) is the new filter output value;
A(k−1) is the old filter output value;
E(k) is the new filter input value;
E(k−1) is the old filter input value.

The cutoff frequency of this digital low pass filter can be modified by varying parameter A. The filter output values A(k) are converted into the control signal V by computer 2 by means of a table, which will be explained with reference to FIG. 4.

Figure 2A:
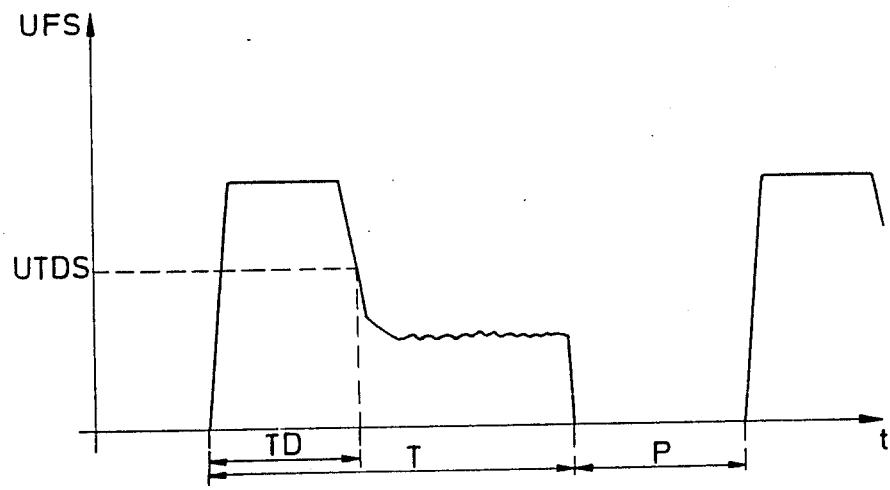
FIGS. 2a and 2b illustrate the course of the erosion voltage and erosion current as a function of time.
Figure 2B:
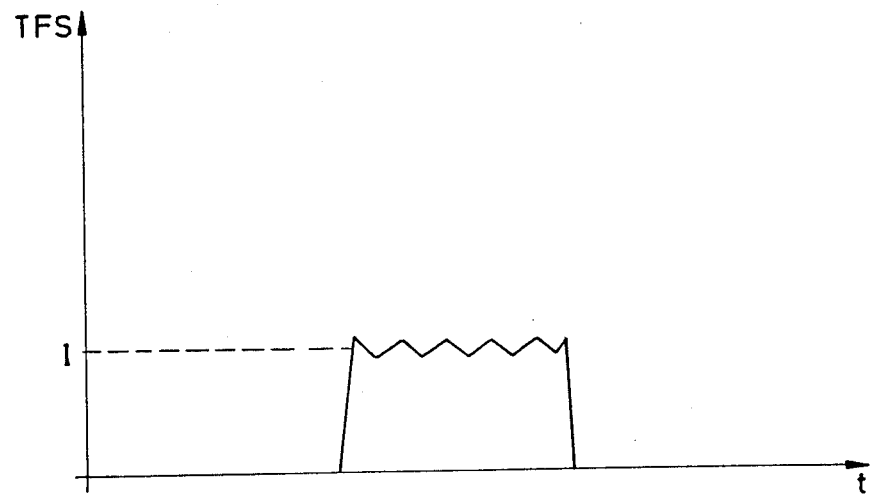

FIG. 2a shows the path of the erosion of spark gap voltage UVS as a function of time t, whilst FIG. 2b shows the spark gap current IFS as a function of time t.

At the end of the ignition time lag TD, the spark gap voltage lead to an erosion current. The value UTDS corresponds to the threshold voltage for calculating the ignition time lag TD. At the end of the pulse duration T, the spark gap voltage UFS is reduced to zero. Correspondingly the spark gap current IFS drops to zero at this time. Before applying the next pulse-like spark gap voltage UFS, there is a pause with pause duration P. The mean value of the spark gap current is designated I. The processing frequency is obtained from the reciprocal of the sum of the pulse duration T and the pause duration P.

FIGS. 3a to 3d show possible dependencies of the cutoff frequency FG on the processing frequency SB (FIG. 3a), the pulse duration T (FIG. 3b), the pause duration P (FIG. 3c) and the average spark gap current I (FIG. 3d).

Computer 2 contains a fixed value table for one or more of the dependences shown in FIGS. 3a to 3d, so that from known process parameters FB, T, P and I it is possible to calculate the sought cutoff frequency FG for the low pass filter function.

Figure 4:
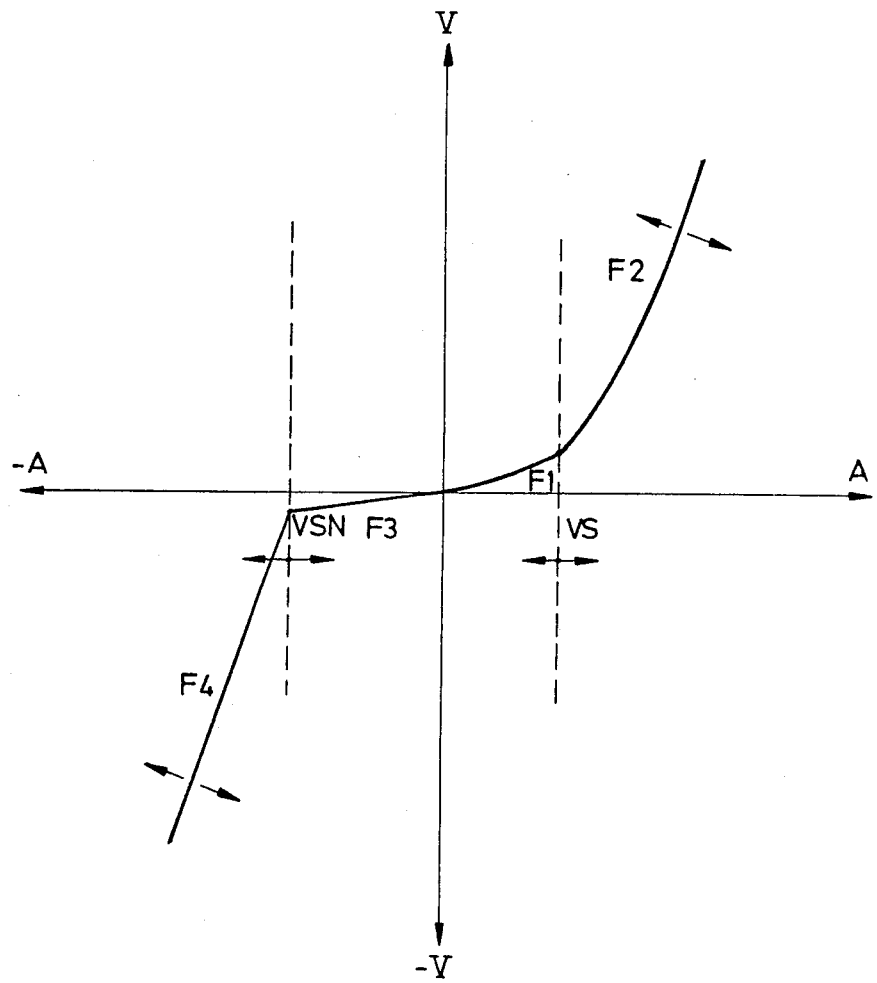
FIG. 4 is a graph illustrating an association of the control signal with the error signal.

The filter output value A resulting from digital low pass filtering is supplied to a further table for carrying out an association of said value with a corresponding control signal V for the driving circuit 3. Such a table is shown in FIG. 4. The association table shown in FIG. 4 comprises four partial functions F1 to F4, whereof the functions F1 and F3, which are limited by the positive and negative thresholds VS, VSN, have a low slope and whereof the functions F2 and F4 have a high slope outside said thresholds.

In the case of a high control deviation, which leads to a high value A at the digital low pass filter output, the servocontrol device must react rapidly and move the erosion electrode towards the workpiece, because in this case the spark gap is too long. The low slope between the positive and negative thresholds VS, VSN leads to a slow, stable control in the area close to an optimum erosion state. If the filter output value is below the negative threshold VSN, which indicates a too short spark gap, then through the high slope of curve part F4 there is a rapid retraction of the erosion electrode to prevent workpiece contact.

The servo-moments are very slow compared with the processing frequency FB and are below typical values for the processing frequency by the factor of 10 to 1000. Thus, a process stabilization cannot be completely achieved through a servo-movement alone. For complete process stabilization it is necessary to influence the electrical parameters of the processing pulse. If the erosion electrode 4 and workpiece 5 are in an approximately optimum reciprocal position, no unnecessary movements are performed by the inventive servocontrol system and in this case the threshold values VS and VSN are increased. This means that the servocontrol system has reached its power limit.

This information is used as a quality criterion for responding to rapid optimization measures. If the thresholds VS and VSN are high, this means that either the process is unstable in itself, because e.g. the average erosion spark gap is too small, or the scavenging is poor, or the processing surface has excessive variations.

In this case a rapid sleeve retraction movement can be initiated, or the pause duration P of the processing pulses can be increased, or the current amplitude I can be modified, or the current pulses can be suppressed, or per se known measures can be taken.

Figure 5:
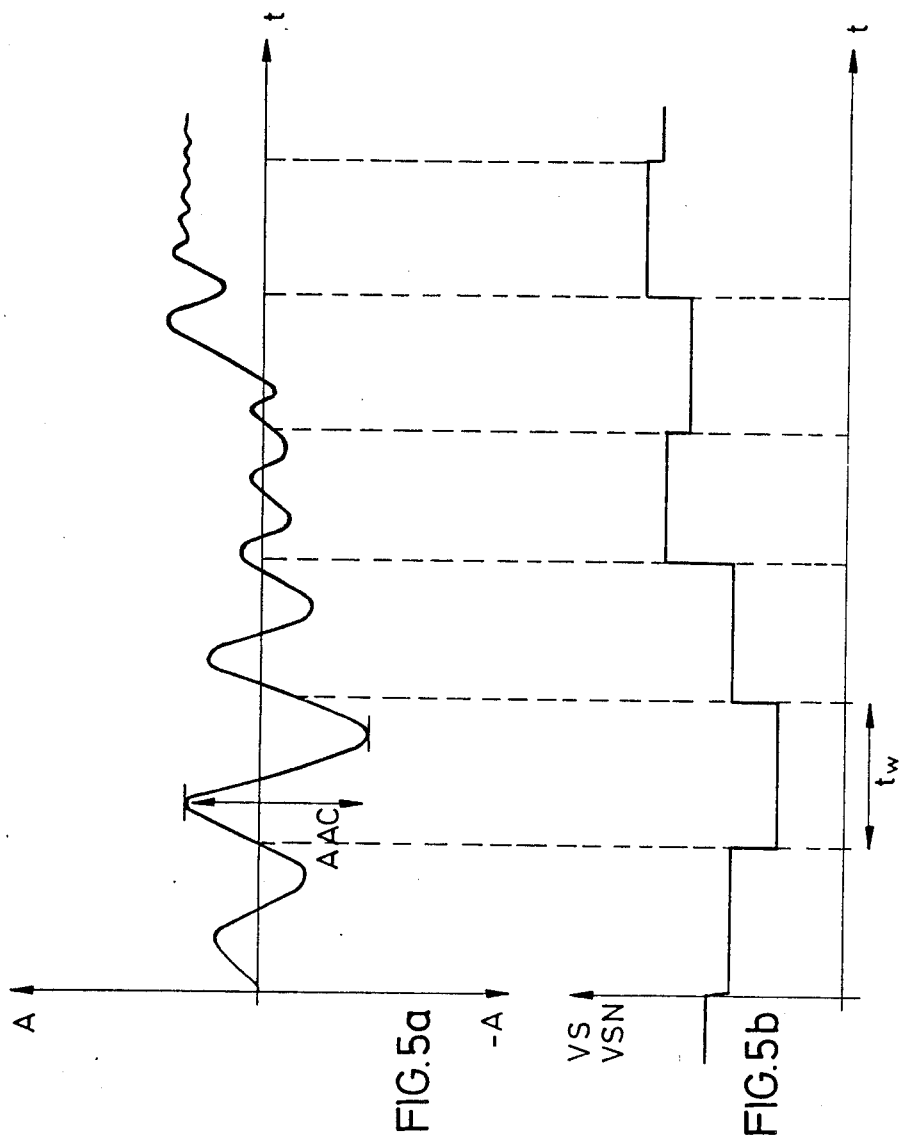
FIGS. 5a and 5b show a representation of the time-dependent alternating component of the error signal and the threshold values.

With respect to FIGS. 5a and 5b, the adaptation of the thresholds VS, VSN for minimizing the alternating component AAC will be described. The thresholds VS and VSN are recalculated at time intervals TW and continuously adapted to the instantaneous process in such a way that the alternating component of the filtered error signal AAC is kept to a minimum. This adaptation is preferably performed by a software routine, but could also be effected in digital technology.

Figure 6:
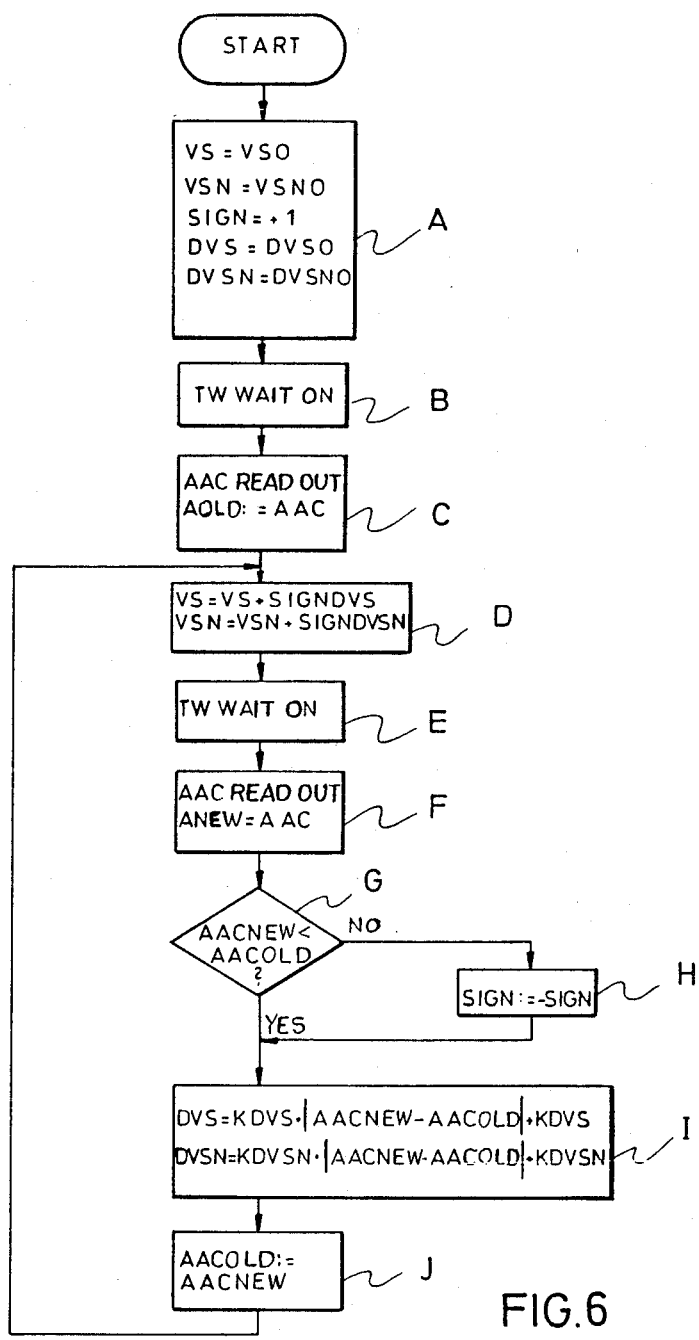
FIG. 6 is a flow chart of an algorithm for determining the threshold values.

FIG. 6 shows a flow chart of an algorithm, which carries out this optimization of the thresholds VS and VSN.

In a first process step A, the thresholds VS and VSN are set to initial values VSO and VSNO, the SIGN is set to +1 and the step widths of thresholds DVS, DVSN are set to initial values DVSO, DVSNO. The time interval TW elapses between two measurements in the next step. In the next step C, the alternating component AAC of the filtered error signal A is read out and the old value of the alternating component renewed.

In the next stage, the threshold is increased by the sign function of the step width both for the positive threshold VS and for the negative threshold VSN. At the end of the time interval TW in step E, the alternating component AAC is again read in and stored as the new alternating component value ANEU. In step G the new value of the alternating component is compared with the old value of the alternating component. If the new value is higher, the signum function is replaced by the negative signum function in step H, whereas otherwise working continues in step I, in that the step widths are calculated from the product of the proportionality coefficients KDVS, KDVSN with the absolute value of the differences of previous and new alternating components AACNEU, AACALT and the sum of the proportionality coefficients.

Then in process step J, the previous value of the alternating component AACALT is replaced by the value AACNEU and is consequently updated. The algorithm continues at process step D.

In other words processing begins with the thresholds being empirical values, an alternating component is calculated after a time interval, thresholds are changed in the positive direction, the alternating component is again calculated and then compared with the previous component. If the new value is smaller than the old value, the thresholds are modified in the same direction. However, if the new value is higher, the thresholds are modified in the reverse direction.

This algorithm can also be used for adapting the slope of functions F2 and F4.

There has been disclosed heretofore the best embodiment of the invention presently contemplated. However, it is to be understood that various changes and modifications may be made thereto without departing from the spirit of the invention.

What is claimed is:

1. A servocontrol device for controlling a position of an erosion electrode with respect to a workpiece in an erosion machine, the servocontrol device comprising means for determining an actual distance between the erosion electrode and the workpiece, means for calculating an error signal on the basis of a difference between the actual distance and a desired distance, a low pass filter circuit, to which the error signal is supplied and which filters said error signal to produce a control signal, and a drive means receiving said control signal and following up the erosion electrode on the basis of said control signal, said low pass filter circuit having an adjustable cutoff frequency, said cutoff frequency being dependent on at least one parameter of a processing pulse supplied to the erosion electrode.

2. Servocontrol device according to claim 1, wherein said means for determining said actual distance is constructed so as to determine an erosion voltage and on the basis of the erosion voltage to produce a signal indicating the actual distance.

3. Servocontrol device according to claim 1, wherein the cutoff frequency is dependent on a processing frequency.

4. Servocontrol device according to claim 3, wherein the cutoff frequency is dependent on a pulse duration of the processing pulse.

5. Servocontrol device according to claim 1, wherein the cutoff frequency is dependent on a pulse duration of the processing pulse.

6. Servocontrol device according to claim 1, wherein the cutoff frequency is dependent on a current amplitude of the processing pulse.

7. Servocontrol device according to claim 1, further comprising an association circuit which associates the control signal with each value of the filtered error signal and wherein an association of said control signal with each value of the error signal is nonlinear.

8. Servocontrol device according to claim 7, wherein a first conversion function (F1) is used for the association in the case if filtered error signal values are smaller than a threshold (VS) and a second conversion function (F2) is used for the association in the case if filtered error signal values are higher than the threshold (VS).

9. Servocontrol device according to claim 8, wherein the threshold (VS) is determined by means of a searching algorithm in such a way that an alternating component of the error signal is kept at a minimum.

10. Servocontrol device according to claim 9, wherein a slope of the second conversion function (F2) is determined by a searching algorithm in such a way that the alternating component of the error signal is kept at a minimum.

11. Servocontrol device according to claim 8, wherein a third conversion function (F3) is used for the association in the case if filtered error signal values are smaller than zero, but higher than a negative threshold (VSN), and a fourth conversion function (F4) is used for the association in the case if filtered error signal values are smaller than the negative threshold (VSN).

12. Servocontrol device according to claim 11, wherein the negative threshold (VSN) is determined by means of a searching algorithm in such a way that the alternating component of the error signal is kept at a minimum.

13. Servocontrol device according to claim 11, wherein the thresholds (VS and VSN) are used for adapting electrical parameters of the processing pulses.

14. Servocontrol device according to claim 11, wherein a slope of the fourth conversion function (F4) is determined by means of a searching algorithm in such a way that the alternating component of the error signal is kept at a minimum.

15. Servocontrol device according to claim 7, wherein said association circuit comprises a programmable computer.

16. Servocontrol device according to claim 7, wherein said association circuit comprises a digital signal processor.

17. Servocontrol device according to claim 11, wherein said association circuit comprises a programmable computer.

18. Servocontrol device according to claim 11, wherein said association circuit comprises a digital signal processor.

* * * * *